June 4, 1968          J. MATTERN          3,387,217

PHASE DETECTOR

Filed April 8, 1966                                2 Sheets-Sheet 1

INVENTOR.
JOHN MATTERN
BY Harry A. Herbert Jr.
ATTORNEY

John P. O'Brien
AGENT $\theta = 90°$
$|E_{01}| = |E_{02}|$
$|E_0| = 0$ $\theta > 90°$
$|E_{01}| < |E_{02}|$
$E_0 = -|E_{02} - E_{01}|$ $\theta < 90°$
$|E_{01}| > |E_{02}|$
$E_0 = +|E_{01} - E_{02}|$ INVENTOR.
JOHN MATTERN
BY Harry A. Herbert Jr
ATTORNEY John P. O'Brien
AGENT

United States Patent Office 3,387,217
Patented June 4, 1968

3,387,217
PHASE DETECTOR
John Mattern, Baltimore, Md., assignor, by mesne assignments, to the United States of America as represented by the Secretary of the Air Force
Filed Apr. 8, 1966, Ser. No. 541,392
3 Claims. (Cl. 328—134)

ABSTRACT OF THE DISCLOSURE

A reference alternating current signal is fed into a ground terminated three-quarter wavelength coaxial line tapped at a point one-quarter wavelength above ground. Push-pull reference voltages, equal in magnitude and 180° out of phase are extracted from the input end and tap point of this line. These reference voltages are fed through respective diodes to two series connected capacitors forming peak detectors. A signal having unknown phase relationship to the reference signal is coupled to a ground terminated one-quarter wavelength coaxial line and fed to the midpoint of the series connected capacitors. Series connected Zener diodes operating in their breakdown regions are connected across the series capacitors and provide at their midpoint a direct current voltage proportional to the phase angle between the known signal and the reference signal.

Background and summary of the invention

The invention provides a phase detector capable of delivering a high output signal with a low internal impedance.

Briefly, this invention comprises a novel phase detector circuit that produces a direct current voltage proportional to the phase angle between two cyclically varying voltages applied to the circuit, referred to herein as a reference voltage and a signal voltage. Both voltages are introduced into the phase detector circuit through separate cathode follower circuits which serve as buffers to isolate the phase detector circuit from the signal and reference lines. Phase detectors known previously in the art are limited by their high internal resistance. By using a novel Zener diode arrangement to couple to the output circuit of the detector as explained herein, this invention produces low internal impedance so that the phase detector circuit will be insensitive to changes in the output circuit's load.

Description of the preferred embodiment

Figure 1:
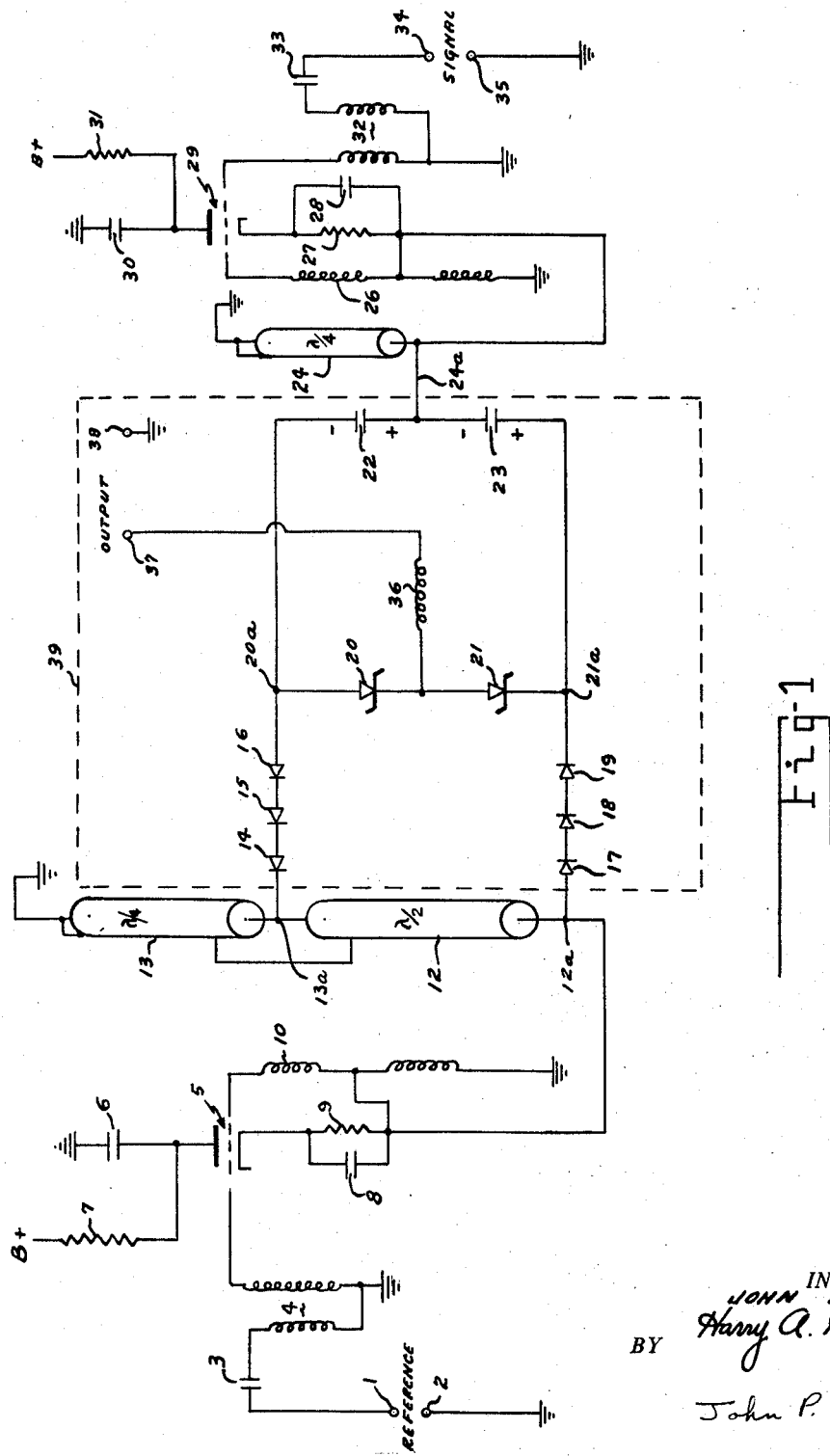
FIG. 1 shows a circuit diagram of a phase detector embodying this invention.

Referring now to FIG. 1, there is shown a schematic diagram of the invention. The reference voltage is applied to terminals 1 and 2, terminal 2 being grounded. Connected across these input terminals is a coupling circuit consisting of capacitor 3 and step-up transformer 4, which couples the reference voltage to the reference cathode follower 5. Applied to terminals 34 and 35 is the signal voltage. The signal voltage is coupled to the signal cathode follower 29, through capacitor 33 and step-up transformer 32. As stated hereinbefore, the purpose of the two cathode follower circuits is to isolate the phase detector circuit 39 from the signal and reference voltage lines. In order to minimize any leakage between the signal and reference lines through the grid to cathode capacitance of the cathode followers, inductors 10 and 27 are connected in shunt to the grid to cathode capacitance of cathode followers 5 and 29, respectively. The values of these inductors are selected so as to form parallel resonant circuits with the grid to cathode capacitances.

The plate of cathode follower 5 is connected to B+ of the power supply through resistor 7. Capacitor 6 serves as a bypass for the high frequency in the conventional manner. Resistor 31 and capacitor 30 perform similar functions for cathode follower 29. Operating biases for cathode followers 5 and 29 are supplied by biasing networks 8–9 and 27–28, respectively.

The cathode circuit of the signal cathode follower 29 is broadly tuned by a $\lambda/4$ section of a shorted coaxial line 24. Since a shorted 1/4 wave section acts as a parallel resonant circuit, it provides the advantage of suppressing the even harmonics of the signal voltage in the cathode circuit of cathode follower 29. The output of cathode follower 29 is derived across coaxial line 24 and is fed into the phase detector circuit 39 by lead 24a. The cathode circuit of the reference cathode follower 5 is tuned by a $3\lambda/4$ section of a shorted coaxial line which is made up by coaxial lines 12 and 13 connected in a series relationship. Coaxial line 13 is a $\lambda/4$ wavelength section and coaxial line 12 is a $\lambda/2$ section. Since the $3\lambda/4$ length of shorted line acts as a resonant circuit, the even harmonics of the reference voltage are also suppressed in the cathode circuit of the reference cathode follower 5. The point 13a is $\lambda/4$ wavelengths above ground and the point 12a is $3\lambda/4$ wavelengths above ground. Since point 12a is $\lambda/2$ wavelength from 13a, the reference voltage appearing at point 12a is equal to and 180° out of phase with the reference voltage appearing at point 13a; the purpose for this particular arrangement being to provide such push-pull reference voltages to the phase detector circuit 39.

The phase detector circuit 39 employs the conventional form of a series of diodes and an associated capacitor to constitute a peak detector. In FIG. 1, diodes 17, 18 and 19 with capacitor 23 comprise one peak detector. Diodes 14, 15 and 16 with capacitor 22 form a second peak detector. By the use of a pair of Zener diodes connected in the phase detector circuit, the phase detector circuit 39 is provided with a low output impedance for the reasons that will be explained hereinafter. As is shown in FIG. 1, Zener diodes 20 and 21 are connected across capacitors 23 and 24 and the phase detector output voltage appears at terminal 37 and 38, terminal 38 being grounded.

Figure 2:
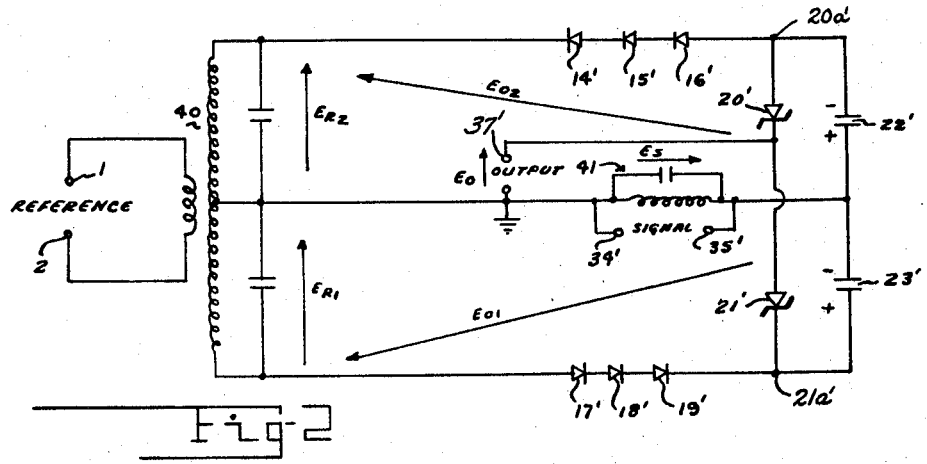
FIG. 2 is a circuit diagram of a phase detector which is useful in setting forth the operation of the phase detector circuit of FIG. 1.

Referring now to FIG. 2, there is shown a circuit useful in setting forth the operation of the phase detector circuit 39 of FIG. 1. As was hereinbefore explained, the reference voltage input into the phase detector circuit 39 consists of two voltage components which are equal in amplitude and 180° out of phase with each other. These two voltages $E_{R1}$ and $E_{R2}$ appear across the secondary windings of tuned transformer 40 which is the equivalent of the $3\lambda/4$ shorted line 12–13 in FIG. 1. The signal voltage input is represnted in FIG. 2 as being applied to the phase detector circuit across tuned circuits 41, the equivalent of shorted $\lambda/4$, line 24 in FIG. 1. The magnitudes of the reference voltages $E_{R1}$ and $E_{R2}$ and the signal voltages $E_S$ are initially set so that the vectorial sums of $E_{R1}+E_S$ and $E_{R2}+E_S$ for a quadrature phase relation are of sufficient magnitudes to enable the resultant direct voltages developed across capacitors 22′ and 23′ to be of a sufficient magnitude to insure that Zener diodes 20' and 21' operate in their breakdown regions for all phase conditions. The Zener diodes will then have a constant potential across points 20a' and 21a'. While at the same time the Zener diodes 20' and 21' provide a coupling to the output terminal 37' of a much lower A.C. impedance than would be provided by the shunt resistor arrangement used for this purpose in the prior art. Thus, the use of Zener diodes provides a much lower output impedance than the previously known phase detectors.

The circuit of FIG. 2 operates in a somewhat unique manner. In the presence of changes in phase, capacitor 22' is charged by a current flowing through the diode string 14', 15', and 16', and discharge through diode string 17', 18', and 19'. Similarly, capacitor 23' is charged by a current flowing through diode string 17', 18' and 19' and discharges through diode string 14', 15' and 16'. Thus, both the charging and discharging currents are carried by the low impedance of the forward conducting diode, resulting in a fast acting, low impedance phase detector.

Figure 3:
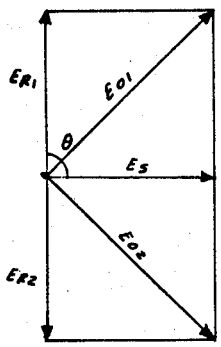
FIGS. 3, 4 and 5 are vector diagrams illustrating, for different phase relationship between the signal and reference voltages, the resultant high frequency voltages applied to the two peak detector in the phase detector circuit.
Figure 4:
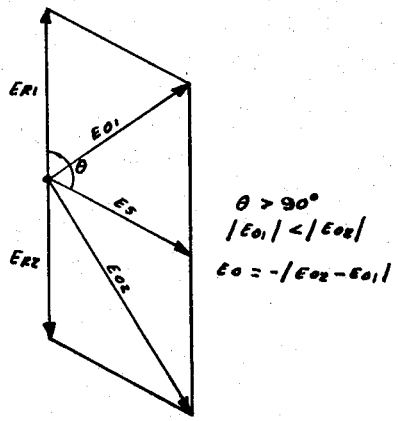
Figure 5:
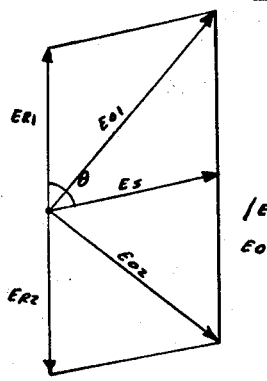

FIGS. 3, 4 and 5 show vector diagrams of the signal and reference voltages to illustrate the resultant high frequency voltages, $E_{01}$ and $E_{02}$, applied to the two peak detectors for different phase relationships between the signal and reference voltages. The phase angle between the two voltages is represented by the symbol $\theta$. FIG. 3 illustrates the condition when the signal voltage and reference voltage are in quadrature ($\theta = 90°$). Here, the two components, $E_{01}$ and $E_{02}$, are equal, resulting in equal voltages across capacitors 22' and 23' and a zero output voltage. FIGS. 4 and 5 illustrate the situation when the phase relationship deviates from quadrature; FIG. 4 showing the case where $\theta$ is greater than 90°, to give a negative output. FIG. 5 illustrates the opposite condition of $\theta$ less than 90° to produce a positive output.

I claim:
1. A phase detector comprising:
    (a) a first and second capacitor connected in series;
    (b) a 1/4 wavelength waveguide section, having the shorted end grounded and the other end connected to the junction between said first and second capacitors;
    (c) a 3/4 wavelength waveguide section, having the shorted end grounded, a first lead connected to the other end and a second lead connected at a point 1/4 wavelength from the shorted end;
    (d) a first rectifying means connected between said first capacitor and said first lead, a second rectifying means connected between said second capacitor and said second lead, said rectifying means being poled in the same direction;
    (e) first and second Zener diodes connected in series with each other and in parallel with said first and second capacitors, said Zener diodes being poled in the same direction in such a manner as to provide a current discharge path from said first and second capacitors to the output when said Zener diodes are operating in their breakdown region;
    (f) an input signal voltage source connected across said 1/4 wavelength waveguide section and an input reference voltage source connected across said 3/4 wavelength waveguide section, the two voltage sources being initially adjusted with a quadrature phase relationship and with sufficient magnitudes to cause said first and second Zener diodes to operate in their breakdown regions for all phase conditions;
    (g) and means for deriving an output voltage between ground and the junction between said Zener diodes, whereby the output voltage magnitude and polarity is directly proportional to the phase angle between the reference voltage and signal voltage and is zero when the voltages are in a quadrature relationship.

2. A phase detector as defined in claim 1 further comprising first and second cathode followers which act as buffers between the input voltage lines and the phase detector:
    (a) said input reference voltage being applied to the grid circuit of said first cathode follower and said input signal voltage source being applied to the grid circuit of said second cathode follower;
    (b) said 3/4 wavelength waveguide section being connected across the cathode circuit of said first cathode follower and said 1/4 wavelength waveguide section being connected across the cathode circuit of said second cathode follower which suppresses the even harmonics of the input reference voltage and the input signal voltage;
    (c) a first and a second inductor element connected, respectively, in shunt with the grid to cathode capacitance of said first and second cathode followers, the values of said first and second inductor element being selected so as to form a parallel resonant circuit with the grid to cathode capacitance in order to minimize any leakage between the signal voltage and reference voltage lines.

3. Apparatus for detecting the magnitude and sense of departure of the phase of a signal wave from a quadrature relation to the phase of a reference wave, said apparatus comprising:
    (a) means for splitting said reference wave into two equal components, one in phase with and one in phase opposition to said reference wave, said means including a 3/4 wavelength waveguide section having a terminal at both ends, one end being shorted, and a third terminal connected at a point 1/4 wavelength from said shorted end, said terminals being coupled to said means for vectorially adding said components to said signal waves;
    (b) means for vectorially adding said components to said signal wave to produce two resultant waves;
    (c) means for rectifying said resultant waves to produce two direct voltages proportional to their peak amplitudes and of opposite polarities relative to a point of reference potential;
    (d) means for applying said direct voltages to the opposite ends of the series connection of two Zener diodes poled for conduction in the reverse direction relative to said direct voltages;
    (e) and an output circuit connected between the junction of said Zener diodes and said point of reference potential, the parameters being such that said Zener diodes operate in their breakdown regions.

References Cited

UNITED STATES PATENTS

| | | | |
|---|---|---|---|
| 2,969,468 | 1/1961 | Hogue | 307—88.5 |
| 3,071,738 | 1/1963 | Schreiner | 333—11 |
| 3,131,367 | 4/1964 | Pitts et al. | 333—31 |
| 3,188,483 | 6/1965 | Steiner | 307—88.5 |
| 3,265,976 | 8/1966 | Broadhead | 328—134 X |

JOHN S. HEYMAN, *Primary Examiner.*